United States Patent
Chen et al.

(10) Patent No.: US 9,164,551 B2
(45) Date of Patent: Oct. 20, 2015

(54) TABLET COMPUTER

(71) Applicant: Quanta Computer Inc., Taoyuan Shien (TW)

(72) Inventors: Gwo-Chyuan Chen, Taipei (TW); Yi-An Lai, Taoyuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 364 days.

(21) Appl. No.: 13/865,845

(22) Filed: Apr. 18, 2013

(65) Prior Publication Data

US 2014/0185218 A1   Jul. 3, 2014

(30) Foreign Application Priority Data

Dec. 28, 2012   (TW) .............................. 101225524 U

(51) Int. Cl.
*G06F 1/16* (2006.01)

(52) U.S. Cl.
CPC .................................... *G06F 1/1669* (2013.01)

(58) Field of Classification Search
CPC .................................................... G06F 1/1669
USPC ............. 361/679.01–679.45, 679.55–679.61, 361/724–747, 752–759, 796–837; 312/223.2, 7.1, 319.9, 333, 348.3, 222, 312/226; 455/575.1–575.5, 347, 550.1, 455/90.3; 248/309.1, 316.8, 917, 922, 923, 248/346.4
See application file for complete search history.

(56) References Cited

U.S. PATENT DOCUMENTS

| | | | | |
|---|---|---|---|---|
| 5,440,502 A * | 8/1995 | Register | .................. | 361/679.17 |
| 5,659,307 A * | 8/1997 | Karidis et al. | .................. | 341/22 |
| 5,754,395 A * | 5/1998 | Hsu et al. | ................ | 361/679.11 |
| 5,907,615 A * | 5/1999 | Kaschke | .................. | 379/433.12 |
| 6,028,768 A * | 2/2000 | Cipolla | .................... | 361/679.12 |
| 6,157,958 A * | 12/2000 | Armitage et al. | ............. | 709/250 |
| 6,282,082 B1 * | 8/2001 | Armitage et al. | ......... | 361/679.22 |
| 6,898,073 B2 * | 5/2005 | Lin | .......................... | 361/679.08 |
| 6,989,984 B2 * | 1/2006 | Sutton et al. | ............. | 361/679.16 |
| 7,130,669 B2 * | 10/2006 | Moon | ......................... | 455/575.3 |
| 7,342,776 B1 * | 3/2008 | Chan | ......................... | 361/679.27 |
| 7,489,503 B2 * | 2/2009 | Maatta | ..................... | 361/679.27 |
| 7,567,433 B2 * | 7/2009 | Chen | ........................ | 361/679.26 |
| D640,686 S * | 6/2011 | Daniel | ......................... | D14/327 |
| 8,009,143 B2 * | 8/2011 | Huang | ......................... | 345/168 |
| 8,023,254 B2 * | 9/2011 | Zhou | ......................... | 361/679.17 |
| 8,416,559 B2 * | 4/2013 | Agata et al. | ............. | 361/679.09 |
| 8,451,595 B2 * | 5/2013 | Leung et al. | ............. | 361/679.13 |
| 8,654,520 B2 * | 2/2014 | Lin et al. | .................. | 361/679.27 |
| 8,724,301 B2 * | 5/2014 | Mahmoud | ................ | 361/679.04 |

(Continued)

*Primary Examiner* — Courtney Smith
*Assistant Examiner* — Rashen E Morrison
(74) *Attorney, Agent, or Firm* — Rabin & Berdo, P.C.

(57) ABSTRACT

A tablet computer includes a housing, a cover, and a keyboard. The housing has an opening and an accommodating trough inwardly recessed from the opening. The accommodating trough has a groove having an inlet section and an engaging section. The inlet section is communicated between the opening and the engaging section. Widths of the inlet section are larger than widths of the engaging section. The cover is pivotally connected to the housing. The cover covers the opening when rotated to a covering position, and supports the housing in a standing position when rotated to an extended position. The keyboard is detachably accommodated in the accommodating trough and includes at least one engaging structure. The engaging structure is located at the peripheral edge of the keyboard and engaged with the engaging section.

9 Claims, 10 Drawing Sheets

(56) References Cited

U.S. PATENT DOCUMENTS

| | | |
|---|---|---|
| 8,780,544 B2* | 7/2014 | Liang et al. ............... 361/679.26 |
| 8,971,026 B2* | 3/2015 | Matsuoka ................. 361/679.09 |
| 8,995,125 B2* | 3/2015 | Matsuoka et al. ....... 361/679.55 |
| 9,047,056 B2* | 6/2015 | Yu ................................... 1/1 |
| 2002/0042853 A1* | 4/2002 | Santoh et al. ..................... 710/8 |
| 2004/0056843 A1* | 3/2004 | Lin et al. ....................... 345/168 |
| 2004/0160738 A1* | 8/2004 | Chen et al. .................... 361/683 |
| 2004/0190239 A1* | 9/2004 | Weng et al. .................... 361/683 |
| 2005/0052831 A1* | 3/2005 | Chen ............................. 361/680 |
| 2005/0200608 A1* | 9/2005 | Ulla et al. ..................... 345/168 |
| 2006/0038795 A1* | 2/2006 | Lee ............................... 345/173 |
| 2006/0104013 A1* | 5/2006 | Sakakibara et al. .......... 361/680 |
| 2008/0094792 A1* | 4/2008 | Chen et al. .................... 361/681 |
| 2010/0277858 A1* | 11/2010 | Zhou ........................ 361/679.17 |
| 2012/0293953 A1* | 11/2012 | Wu et al. .................. 361/679.56 |
| 2013/0033807 A1* | 2/2013 | Kim .......................... 361/679.01 |
| 2013/0100027 A1* | 4/2013 | Wang et al. .................... 345/168 |
| 2013/0203473 A1* | 8/2013 | Kota ........................... 455/575.8 |
| 2013/0257733 A1* | 10/2013 | Moore et al. .................. 345/168 |
| 2013/0329375 A1* | 12/2013 | Chiang et al. ................. 361/728 |
| 2014/0185218 A1* | 7/2014 | Chen et al. ............... 361/679.09 |
| 2014/0218855 A1* | 8/2014 | Fujino et al. ............. 361/679.12 |

* cited by examiner

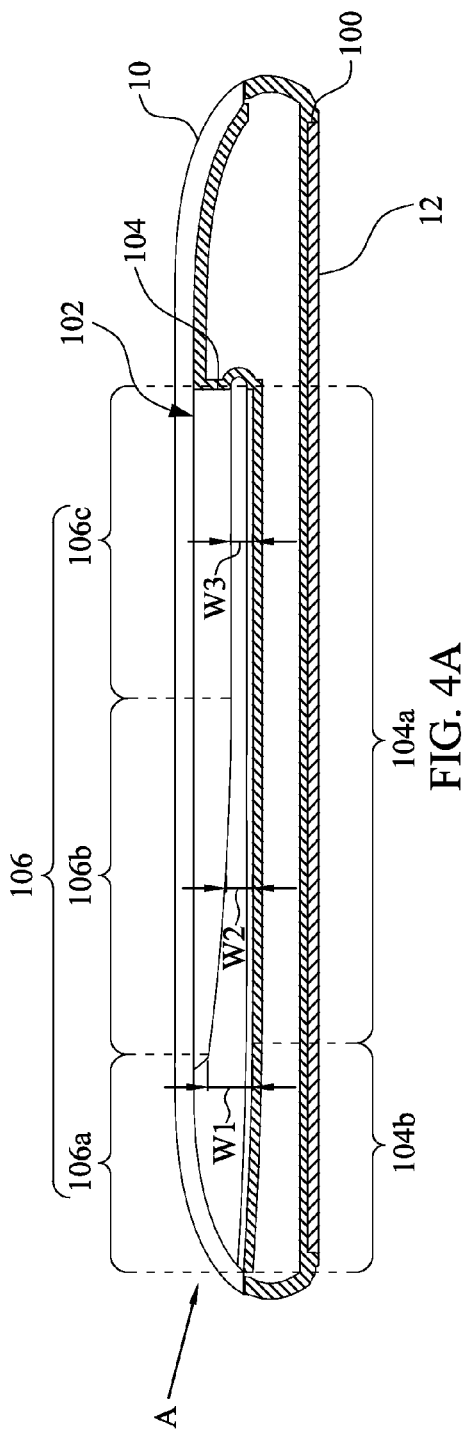
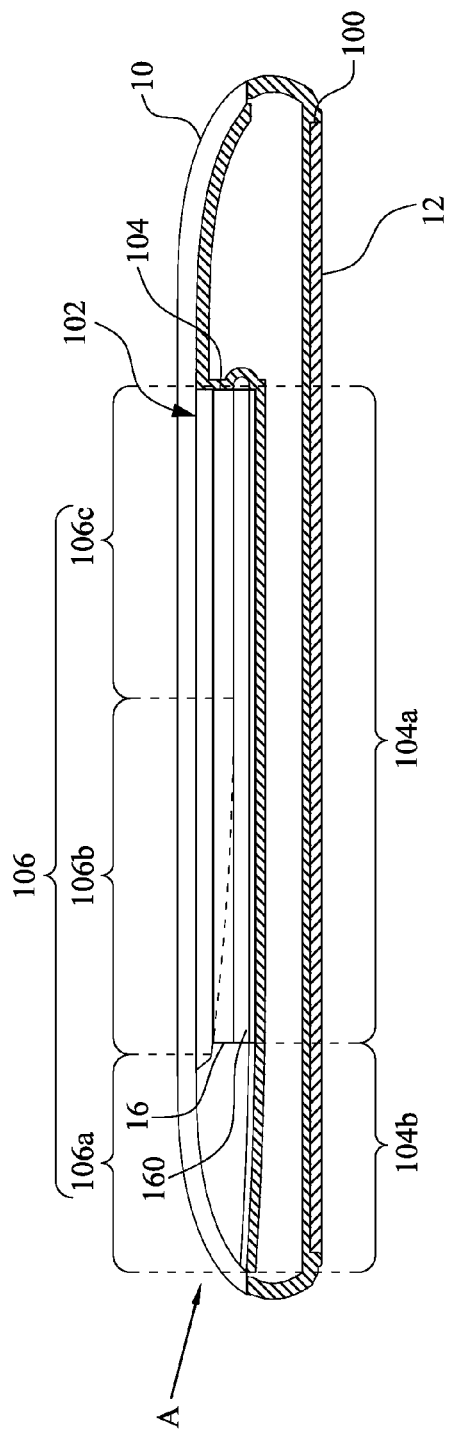
FIG. 4A
FIG. 4B

TABLET COMPUTER

RELATED APPLICATIONS

This application claims priority to Taiwan Application Serial Number 101225524, filed Dec. 28, 2012, which is herein incorporated by reference.

BACKGROUND

1. Technical Field

The present disclosure relates to a tablet computer, more particularly, to a tablet computer capable of accommodating a keyboard.

2. Description of Related Art

Computers are the most widely used tool in life and work for most people in modern society. A typical desktop computer includes a screen, a host, a keyboard, a mouse, a printer, and related peripherals. However, due to the numerous components, installation difficulties, and other reasons limiting mobility, such desktop computers are not portable. Therefore, notebook computers, which are portable and convenient to use, have advantages over desktop computers.

Most currently used notebook computers are foldable and have screens and interface designs. Although a notebook computer can provide portable convenience, it is still sizable and heavy (e.g., about 1 to 2 KG or more), which make it somewhat inconvenient to carry and use. Therefore, a tablet computer that has an integrally formed body and adopts a touch screen (e.g., an iPad®) has been developed. A user can input operation signals through the operation interface formed by the touch screen of the tablet computer. Accordingly, through such a configuration, the size of the tablet computer can be substantially reduced.

However, such a tablet computer that utilizes a touch screen is still associated with inconvenience and difficulty in use. For example, the tablet computer and the touch screen disposed thereon can only be horizontally placed and cannot be placed standing up vertically or at an inclined angle. While using the tablet computer, the user must bow his or her head to view the screen, leading to user neck and shoulder discomfort. If the tablet computer is placed leaning against another object, it does not stay in position and easily slides, thereby causing inconvenience during operation.

The significant development of tablet computers has led to the offering of many peripheral products for tablet computers. Physical keyboards are an example, and provide users good operating feedback. In addition to separate external keyboards, there are a number of designs integrally combining a tablet and a keyboard. For example, a tablet computer can be designed with a removable holster for a keyboard or with a hard protective cover that functions also as a keyboard. Some tablet computers even have dedicated keyboards as original accessories, thereby allowing the tablet computer to be used just like a notebook computer after such a keyboard is combined with the rest of the tablet computer.

However, even though an external keyboard can be combined with a conventional tablet computer, such a configuration runs counter to present-day trends toward practicality, sophistication, and a lightweight, thin, short, and small design for today's electronic products. Accordingly, providing a design that integrally combines a tablet computer and an external keyboard has become an important issue to be solved.

SUMMARY

The disclosure provides a tablet computer. The tablet computer includes a housing, a cover, and a keyboard. The housing has an opening and an accommodating trough. The accommodating trough is inwardly recessed from the opening. A sidewall of the accommodating trough has a groove. The groove has an inlet section and an engaging section. The inlet section is communicated between the opening and the engaging section. Widths of the inlet section are larger than widths of the engaging section. The cover is pivotally connected to the housing, so as to rotate between a covering position and an extended position relative to the housing. The cover covers the opening when rotated to a covering position, and supports the housing in a standing position when rotated to an extended position. The keyboard is detachably accommodated in the accommodating trough and includes at least one engaging structure. The engaging structure is located at the peripheral edge of the keyboard and engaged with the engaging section.

In an embodiment of the disclosure, a portion of the bottom of the accommodating trough that corresponds to the engaging section is parallel to the keyboard. A portion of the bottom of the accommodating trough that corresponds to the inlet section is curved toward the opening along a direction away from the engaging section.

In an embodiment of the disclosure, the groove further has a tapered section. Two ends of the tapered section are respectively communicated with the inlet section and the engaging section. Widths of the tapered section are decreased from the inlet section to the engaging section.

In an embodiment of the disclosure, the bottom of the accommodating trough has a parallel portion and a curved portion. The parallel portion corresponds to the engaging section and partially to the tapered section, and is parallel to the keyboard. The curved portion is connected to the parallel portion, corresponds to the inlet section and partially to the tapered section, and is curved toward the opening along a direction away from the engaging section.

In an embodiment of the disclosure, the keyboard is accommodated in the accommodating trough and supported on the parallel portion.

In an embodiment of the disclosure, the engaging structure is a protruding strip. The length of the protruding strip is equal to or smaller than the sum of the length of the engaging section and the length of the tapered section. The width of the engaging section is uniform along the length thereof. A part of the protruding strip is accommodated in the tapered section, and another part of the protruding strip is accommodated in the engaging section.

In an embodiment of the disclosure, the engaging structure includes a plurality of protrusions. The width of the engaging section is uniform along the length thereof. The protrusions are engaged in the engaging section.

In an embodiment of the disclosure, the keyboard includes a first ferromagnetic member. The housing includes a second ferromagnetic member. The second ferromagnetic member is disposed at the sidewall of the accommodating trough so as to magnetically attract the first ferromagnetic member when the keyboard is accommodated in the accommodating trough.

In an embodiment of the disclosure, the housing further has a hole. The tablet computer further includes a hinge. The hinge includes a pivotal portion and a connecting portion. The pivotal portion is pivotally connected to the housing from the interior of the housing. Two ends of the connecting portion are respectively connected to the pivotal portion and the cover. The pivotal portion and the connecting portion are located in the hole when the cover is located at the covering position, and the pivotal portion abuts against an inner surface of the housing and the connecting portion extends out of the hole when the cover is located at the extended position.

In an embodiment of the disclosure, the tablet computer further includes an elastic piece. The elastic piece is disposed in the housing and adjacent to the hole. The elastic piece abuts against the connecting portion to urge the cover toward the opening when the cover is located at the covering position, and abuts against the pivotal portion to make the pivotal portion abut toward the inner surface when the cover is located at the extended position.

The tablet computer has an accommodating trough for accommodating a keyboard and a cover for covering the accommodating trough. Therefore, when the cover covers the accommodating trough, the keyboard can be received in the interior of the tablet computer and the back of the tablet computer maintains its original and complete appearance, such that people are unaware of the presence of the keyboard. When the cover is extended relative to the housing, it can support the tablet computer in a standing position. In some embodiments, the accommodating trough has a groove, and the groove has an inlet section, a tapered section, and an engaging section, widths of which are reduced gradually. Therefore, during the insertion of the keyboard into the accommodating trough, the inlet section has the effect of allowing the engaging structure on the keyboard to easily enter the accommodating trough, the tapered section has the effect of smoothly guiding the engaging structure to move toward the engaging section, and the engaging section has the effect of engaging the engaging structure so as to prevent the keyboard from being removed from the accommodating trough along a direction away from the bottom of the accommodating trough.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 4A is a cross-sectional view of the tablet computer in FIG. 2 along line 4A-4A';

FIG. 4B is another cross-sectional view of the tablet computer in FIG. 4A, in which the keyboard is accommodated in the accommodating trough;

DETAILED DESCRIPTION

Figure 1A:
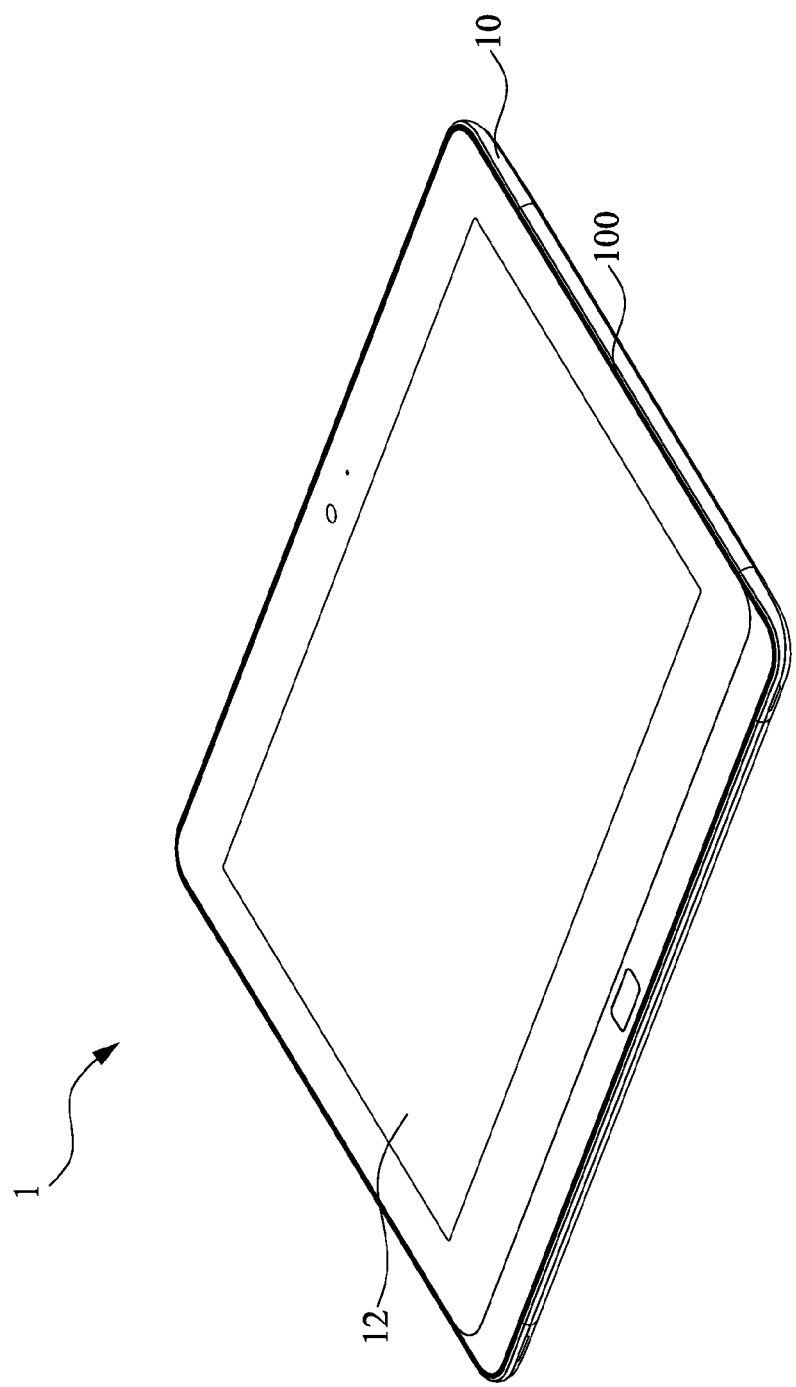
FIG. 1A is a perspective view of a tablet computer according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
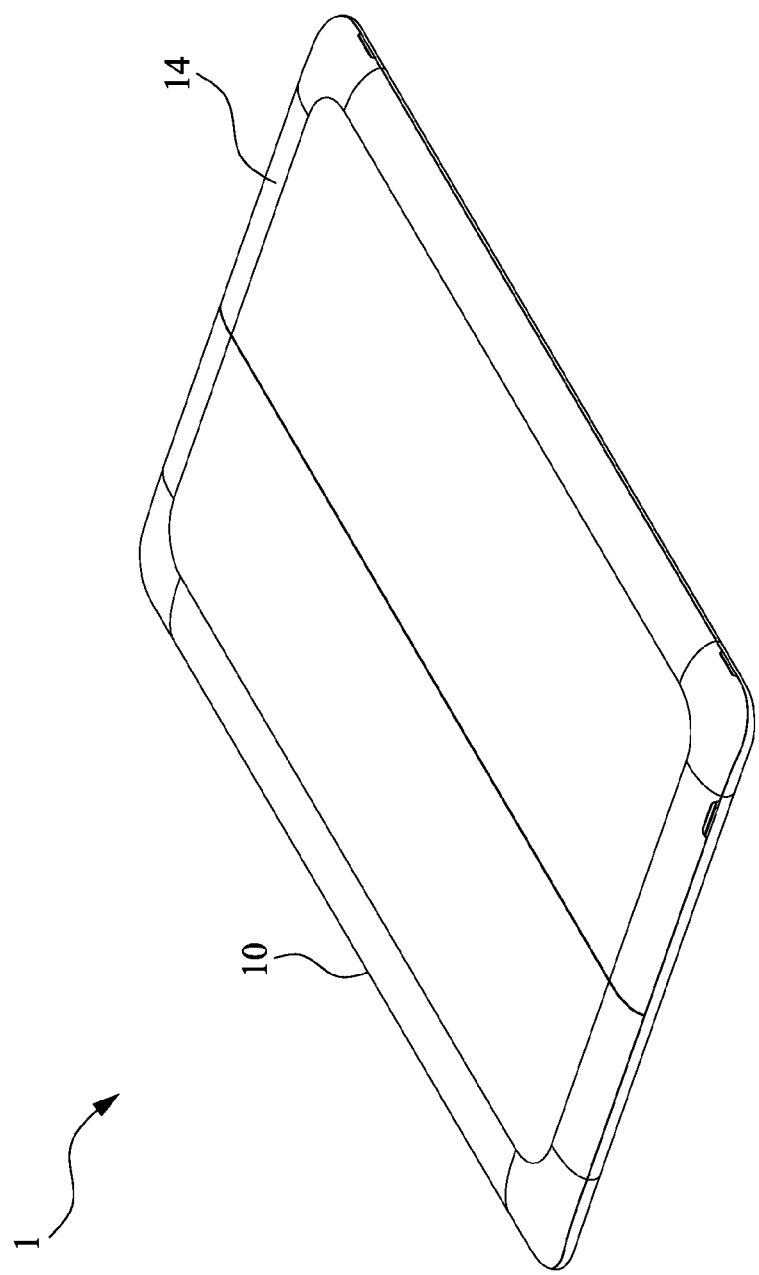
FIG. 1B is another perspective view of the tablet computer in FIG. 1A, in which a cover has been rotated to a covering position relative to a housing.
Figure 1C:
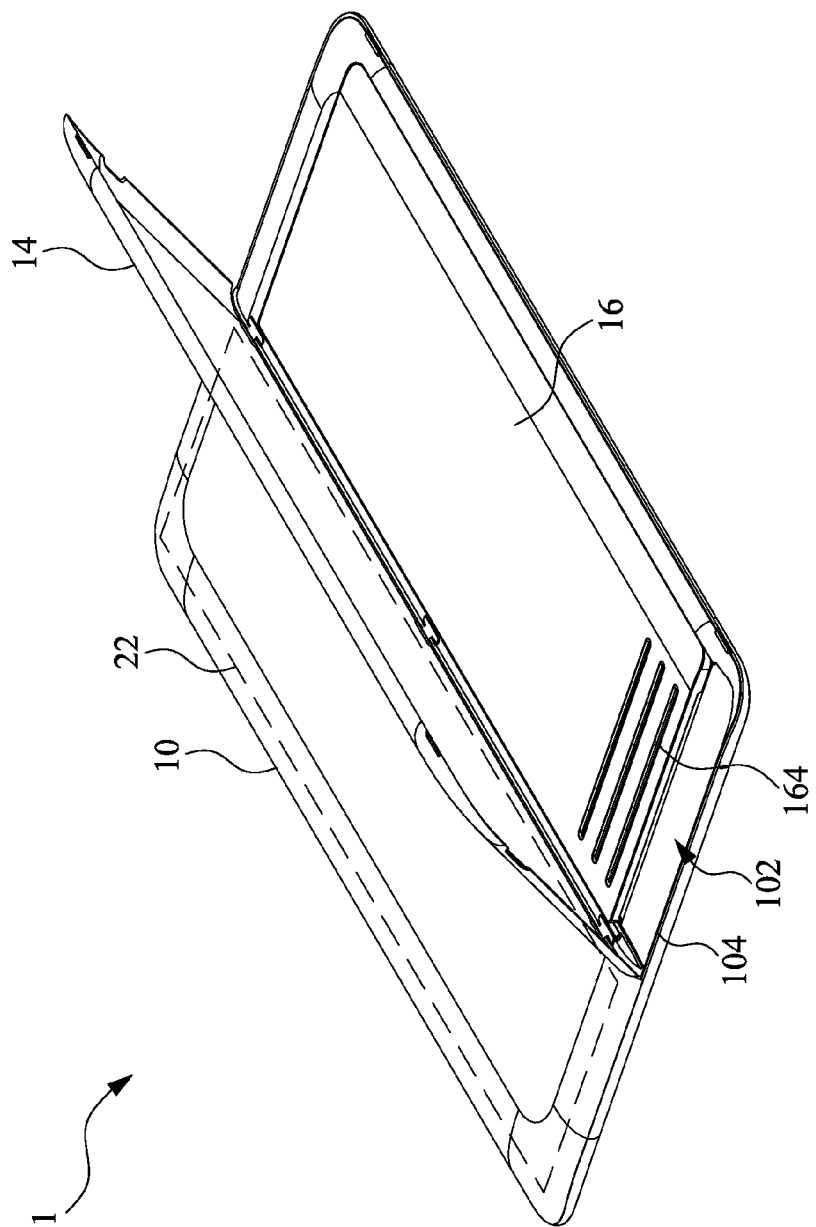
FIG. 1C is another perspective view of the tablet computer in FIG. 1B, in which the cover has been rotated to an extended position relative to the housing.
Figure 1D:
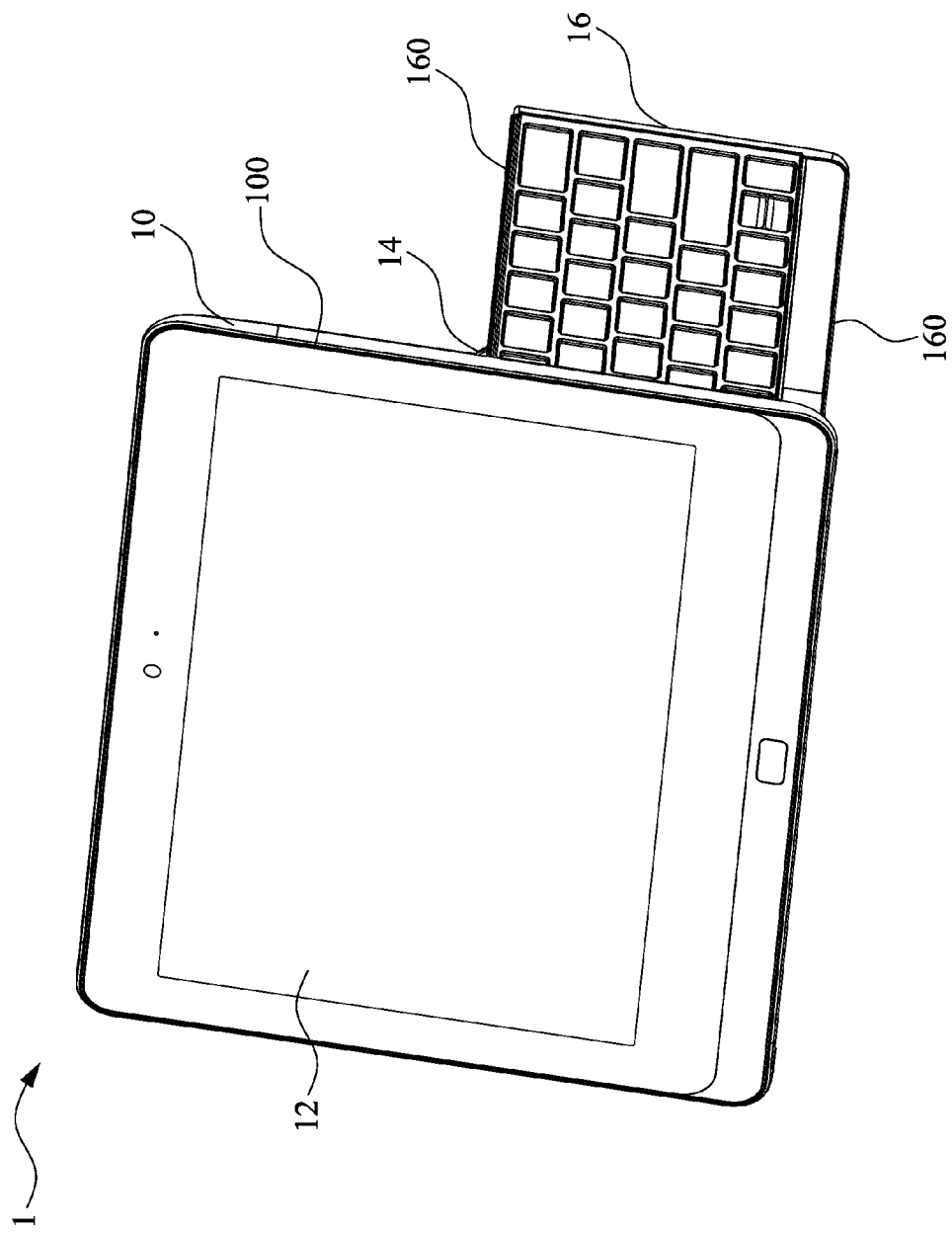
FIG. 1D is another perspective view of the tablet computer in FIG. 1C, in which a keyboard is partially taken out of the tablet computer.

FIG. 1A is a perspective view of a tablet computer 1 according to an embodiment of the disclosure. FIG. 1B is another perspective view of the tablet computer 1 in FIG. 1A, in which a cover 14 has been rotated to a covering position relative to a housing 10. FIG. 1C is another perspective view of the tablet computer 1 in FIG. 1B, in which the cover 14 has been rotated to an extended position relative to the housing 10. FIG. 1D is another perspective view of the tablet computer 1 in FIG. 1C, in which a keyboard 16 is partially taken out of the tablet computer 1.

As shown in FIG. 1A, the tablet computer 1 includes the housing 10 and a display panel module 12. The front of the housing 10 of the tablet computer 1 has an assembly opening 100. The size of the assembly opening 100 of the housing 10 is matched with the size of the display panel module 12, so that the display panel module 12 can be engaged with the assembly opening 100.

As shown in FIG. 1B and FIG. 1C, the tablet computer 1 includes the cover 14 and the keyboard 16. The back of the housing 10 of the tablet computer 1 has an opening 102 and an accommodating trough 104. The accommodating trough 104 of the housing 10 is inwardly recessed from the opening 102. The keyboard 16 of the tablet computer 1 is detachably accommodated in the accommodating trough 104. The cover 14 of the tablet computer 1 is pivotally connected to the back of the housing 10 and thus is able to rotate between the covering position (as FIG. 1B shows) and the extended position (as FIG. 1C shows) relative to the housing 10.

When the cover 14 of the tablet computer 1 rotates to the covering position relative to the housing 10, the cover 14 covers the opening 102 so that the original and complete appearance of the back of the tablet computer 1 is maintained. Therefore, the keyboard 16 that is accommodated in the accommodating trough 104 can be entirely received in the interior of the tablet computer 1, and people are unaware of the presence of the keyboard 16.

In order to achieve the purpose of accommodating the keyboard 16 in the tablet computer 1, a circuit module 22 (indicated by the dotted lines in FIG. 1C) of the tablet computer 1 is disposed in another part of the housing 10 that is not occupied by the accommodating trough 104. The circuit module 22 of the tablet computer 1 includes electronic components, such as a motherboard, a CPU (central processing unit), a battery, etc.

As shown in FIG. 1D, when the cover 14 of the tablet computer 1 rotates to the extended position relative to the housing 10, it can support the housing 10 in a standing position. In addition, in a state where the tablet computer 1 is supported in a standing position by the cover 14, a user can reach a hand to the back of the tablet computer 1, hold a slip proof portion 164 (as shown in FIG. 1C) located at the back of the keyboard 16, and smoothly take the keyboard 16 out of the accommodating trough 104 from a side of the tablet computer 1 without flipping over or otherwise moving the tablet computer 1.

Furthermore, the keyboard 16 can be wirelessly connected to the circuit module 22 of the tablet computer 1 using a wireless transmission technology, such as Bluetooth, Wi-Fi (Wireless Fidelity), ZigBee, a wireless transmission technology based on RF (radio frequency), DLP (Digital Light Processing) LINK, infrared, etc., but the disclosure is not limited in this regard.

Figure 2:
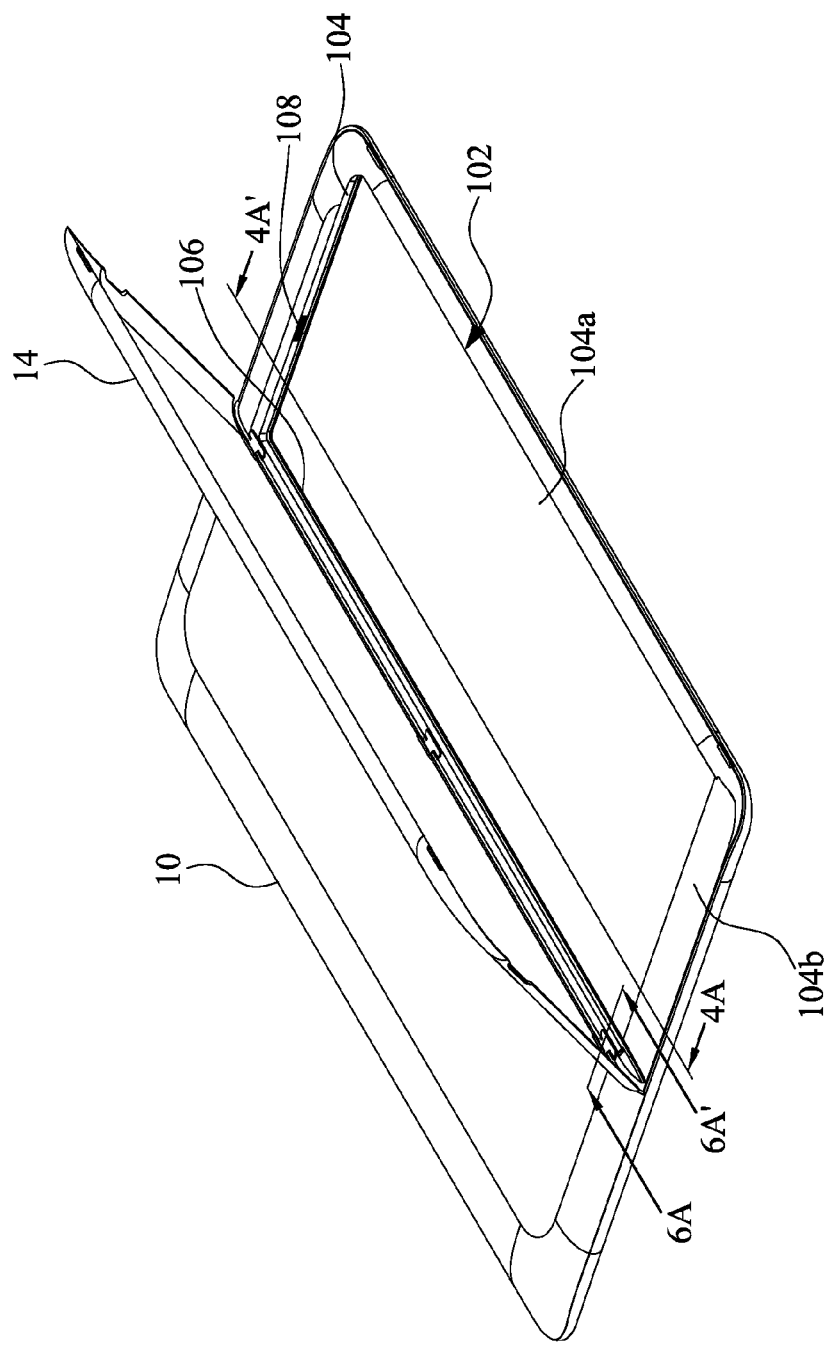
FIG. 2 is another perspective view of the tablet computer in FIG. 1C, in which the keyboard has been entirely removed from the housing.
Figure 3:
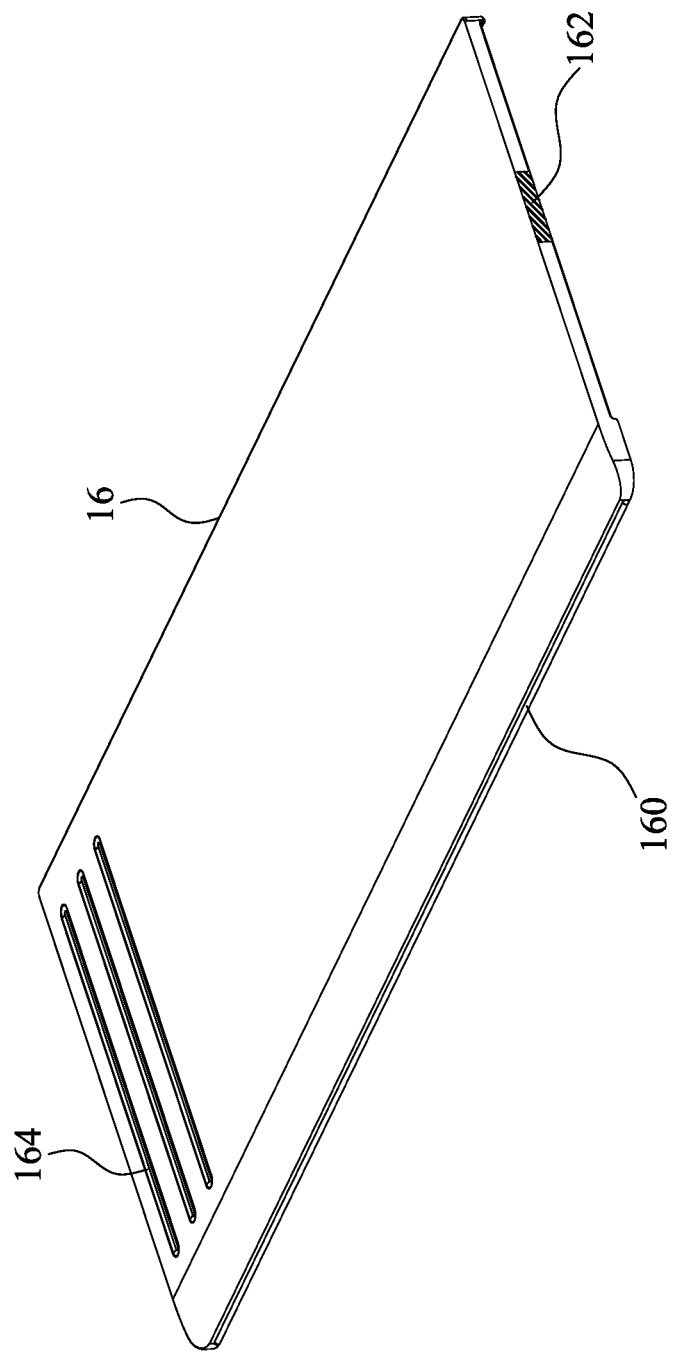
FIG. 3 is a rear perspective view of the keyboard in FIG. 1C.

FIG. 2 is another perspective view of the tablet computer 1 in FIG. 1C, in which the keyboard 16 has been entirely removed from the housing 10. FIG. 3 is a rear perspective view of the keyboard 16 in FIG. 1C.

As shown in FIG. 2 and FIG. 3, a sidewall of the accommodating trough 104 has a groove 106. The groove 106 of the accommodating trough 104 is substantially formed along the bottom of the accommodating trough 104. The keyboard 16 of the tablet computer 1 is detachably accommodated in the accommodating trough 104 and includes engaging structures. The engaging structures of the keyboard 16 are located at the peripheral edge of the keyboard 16.

In the embodiment of the disclosure, the engaging structures of the keyboard 16 are two protruding strips 160 which are respectively located at two opposite edges of the keyboard 16 (as shown in FIG. 1D). Corresponding to this structure, two opposite sidewalls (i.e., the sidewall that is adjacent to where the cover 14 is pivotally rotated to the housing 10 and the sidewall that is opposite from where the cover 14 is pivotally rotated to the housing 10) of the accommodating trough 104 respectively have two grooves 106 for engaging the protruding strips 160 of the keyboard 16. Therefore, when the keyboard 16 of the tablet computer 1 is accommodated in the accommodating trough 104, the protruding strips 160 of the keyboard 16 can be engaged in the grooves 106, so that the keyboard 16 is prevented from being removed from the accommodating trough 104 along a direction away from the bottom of the accommodating trough 104.

Furthermore, the keyboard 16 of the tablet computer 1 includes a first ferromagnetic member 162. The first ferromagnetic member 162 of the keyboard 16 is disposed at the peripheral edge of the keyboard 16. The housing 10 of the tablet computer 1 includes a second ferromagnetic member 108. The second ferromagnetic member 108 of the housing 10 is disposed at a sidewall of the accommodating trough 104, so as to magnetically attract the first ferromagnetic member 162 of the keyboard 16 when the keyboard 16 is accommodated in the accommodating trough 104. Therefore, when the keyboard 16 of the tablet computer 1 is accommodated in the accommodating trough 104, the first ferromagnetic member 162 and the second ferromagnetic member 108 that are magnetically attracted to each other can achieve the effect of preventing the keyboard 16 from being removed from the accommodating trough 104 along a direction parallel to the bottom of the accommodating trough 104.

FIG. 4A is a cross-sectional view of the tablet computer 1 in FIG. 2 along line 4A-4A'. FIG. 4B is another cross-sectional view of the tablet computer 1 in FIG. 4A, in which the keyboard 16 is accommodated in the accommodating trough 104.

As shown in FIG. 4A and FIG. 4B, the groove 106 of the accommodating trough 104 has an inlet section 106a, a tapered section 106b, and an engaging section 106c. It is noted that, in this embodiment, the groove 106 of the accommodating trough 104 formed in the opposite sidewall of the accommodating trough 104 has the same structure, and is engaged with the corresponding protruding strip 160 of the keyboard 16 (see FIG. 3) in the same manner. The inlet section 106a of the groove 106 is communicated between the opening 102 and the tapered section 106b, and the tapered section 106b is communicated between the inlet section 106a and the engaging section 106c. In the embodiment of the disclosure, widths W1 of the inlet section 106a are larger than widths W3 of the engaging section 106c, and widths W2 of the tapered section 106b are decreased from an area thereof adjacent to the inlet section 106a to an area thereof adjacent to the engaging section 106c. In other words, the widths W1 of the inlet section 106a at any point along the length thereof except possibly at an area immediately adjacent to the tapered section 106b are larger than the widths W2 of the tapered section 106b at any point along the length thereof, and the widths W2 of the tapered section 106b at any point along the length thereof except possibly at an area immediately adjacent to the engaging section 106c are larger than the widths W3 of the engaging section 106c at any point along the length thereof.

Therefore, during the insertion of the keyboard 16 of the tablet computer 1 into the accommodating trough 104, the inlet section 106a of the groove 106 has the effect of allowing the protruding strip 160 on the keyboard 16 to easily enter the accommodating trough 104, the tapered section 106b of the groove 16 has the effect of smoothly guiding the protruding strip 160 to move toward the engaging section 106c, and the engaging section 106c has the effect of engaging the protruding strip 160 so as to prevent the keyboard 16 from being removed from the accommodating trough 104 along the direction away from the bottom of the accommodating trough 104.

As shown in FIG. 2, FIG. 4A, and FIG. 4B, the bottom of the accommodating trough 104 has a parallel portion 104a and a curved portion 104b. The parallel portion 104a of the accommodating trough 104 corresponds to the engaging section 106c and partially to the tapered section 106b of the groove 106, and is parallel to the keyboard 16. Therefore, when the keyboard 16 is accommodated in the accommodating trough 104, it can be supported on the parallel portion 104a. The curved portion 104b of the accommodating trough 104 is connected to the parallel portion 104a, corresponds to the inlet section 106a and partially to the tapered section 106b of the groove 106, and is curved toward the opening 102 of the housing 10 along a direction away from the engaging section 106c. Therefore, the keyboard 16 can be assembled into the accommodating trough 104 along an insertion direction A that is not parallel to the parallel portion 104a of the accommodating trough 104.

In other words, the curved portion 104b of the accommodating trough 104 has the effect of allowing the keyboard 16 to be assembled into the accommodating trough 104 along the insertion direction A that is not parallel to the parallel portion 104a of the accommodating trough 104, and the inlet section 106a of the groove 106 increases the amount of space in this area so that the insertion direction A is expanded to cover a wide range. Therefore, the convenience of inserting the keyboard 16 into the accommodating trough 104 can be increased.

Furthermore, in the embodiment of the disclosure, the width W3 of the engaging section 106c of the groove 106 is uniform along the length thereof. The length of the protruding strip 160 is slightly smaller than the sum of the length of the engaging section 106c and the length of the tapered section 106b. A part of the protruding strip 160 is accommodated in the tapered section 106b, and another part of the protruding strip 160 is accommodated in the engaging section 106c. When the keyboard 16 of the tablet computer 1 is accommodated in the accommodating trough 104, the portion of the protruding strip 160 that is accommodated in the engaging section 106c of the groove 106 corresponds in shape to the engaging section 106c, so that the protruding strip 160 can be firmly engaged with the engaging section 106c. Because the widths W2 of the tapered section 106b are larger than the widths W3 of the engaging section 106c, the portion of the protruding strip 160 that is accommodated in the tapered section 106b is not tightly engaged with the tapered section 106b along the entire length of this portion of the protruding strip 160 (as the dotted lines in FIG. 4B shows), but the disclosure is not limited in this regard.

In another embodiment of the disclosure, the protruding strip 160 of the keyboard 16 has only the portion that is accommodated in the engaging section 106c and does not include the portion that is accommodated in the tapered section 106b.

Figure 5:
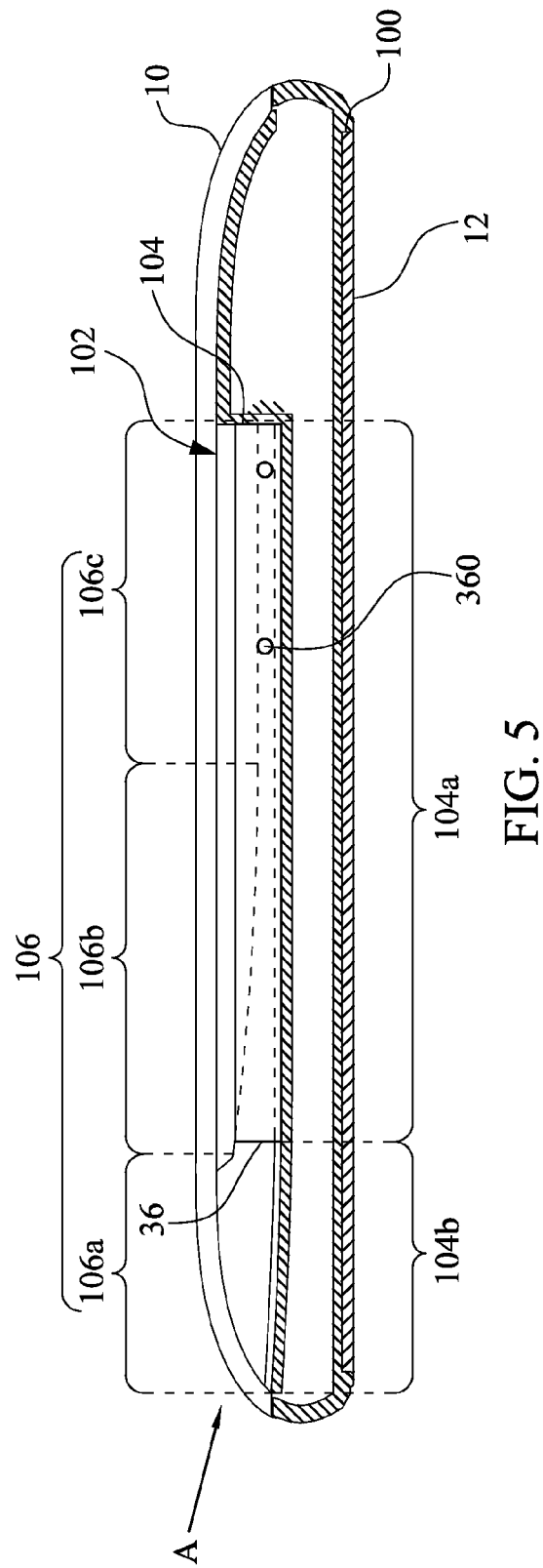
FIG. 5 is a cross-sectional view of another embodiment of the tablet computer in FIG. 4B according to the disclosure.

FIG. 5 is a cross-sectional view of another embodiment of the tablet computer 1 in FIG. 4B according to the disclosure.

As shown in FIG. 5, the engaging structures of the keyboard 36 are two protrusions 360. When the keyboard 36 is inserted into the accommodating trough 104, the protrusions 360 of the keyboard 36 are accommodated in the engaging section 106c of the groove 106 and firmly engaged with the engaging section 106c. Therefore, the engaging section 106c of the groove 106 has the effect of engaging the protrusions 360 to prevent the keyboard 36 from being removed from the accommodating trough 104 along a direction away from the bottom of the accommodating trough 104.

Figure 6A:
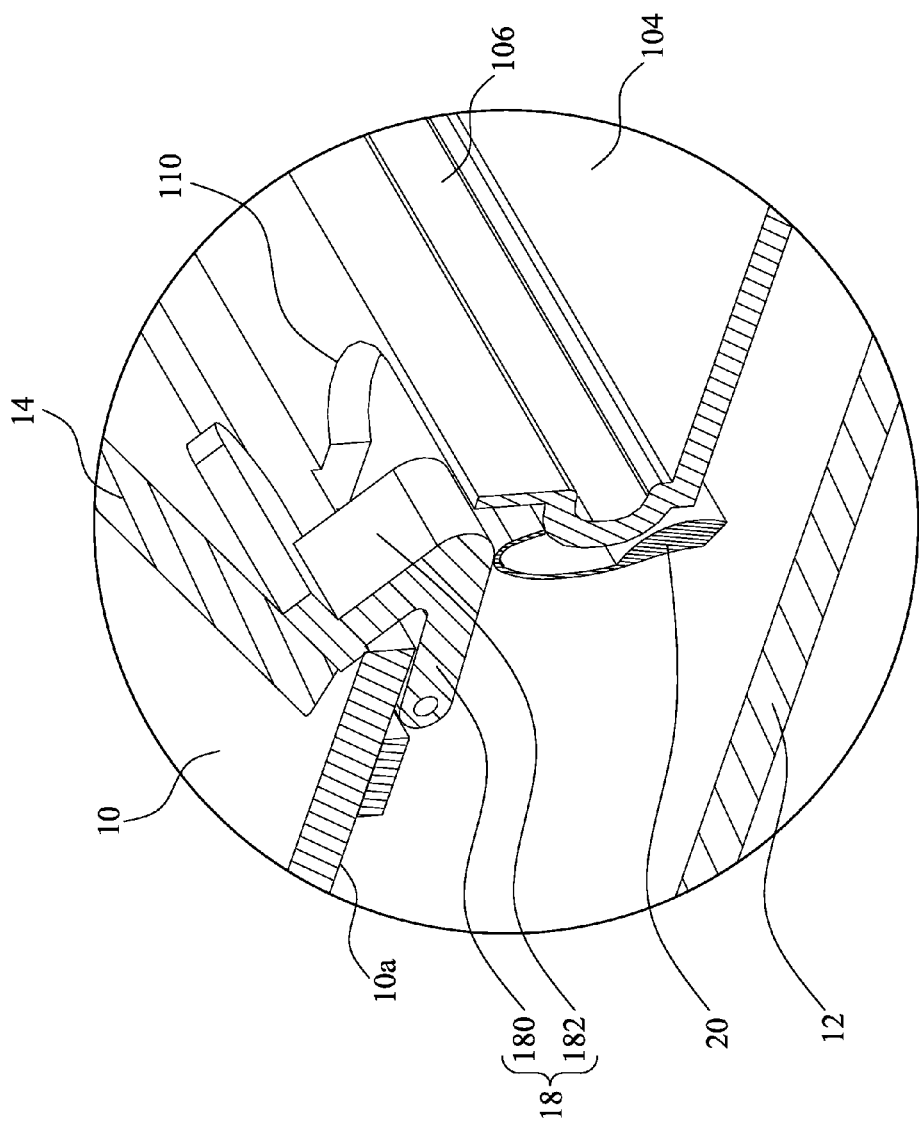
FIG. 6A is a cross-sectional view of the tablet computer in FIG. 2 along line 6A-6A'.
Figure 6B:
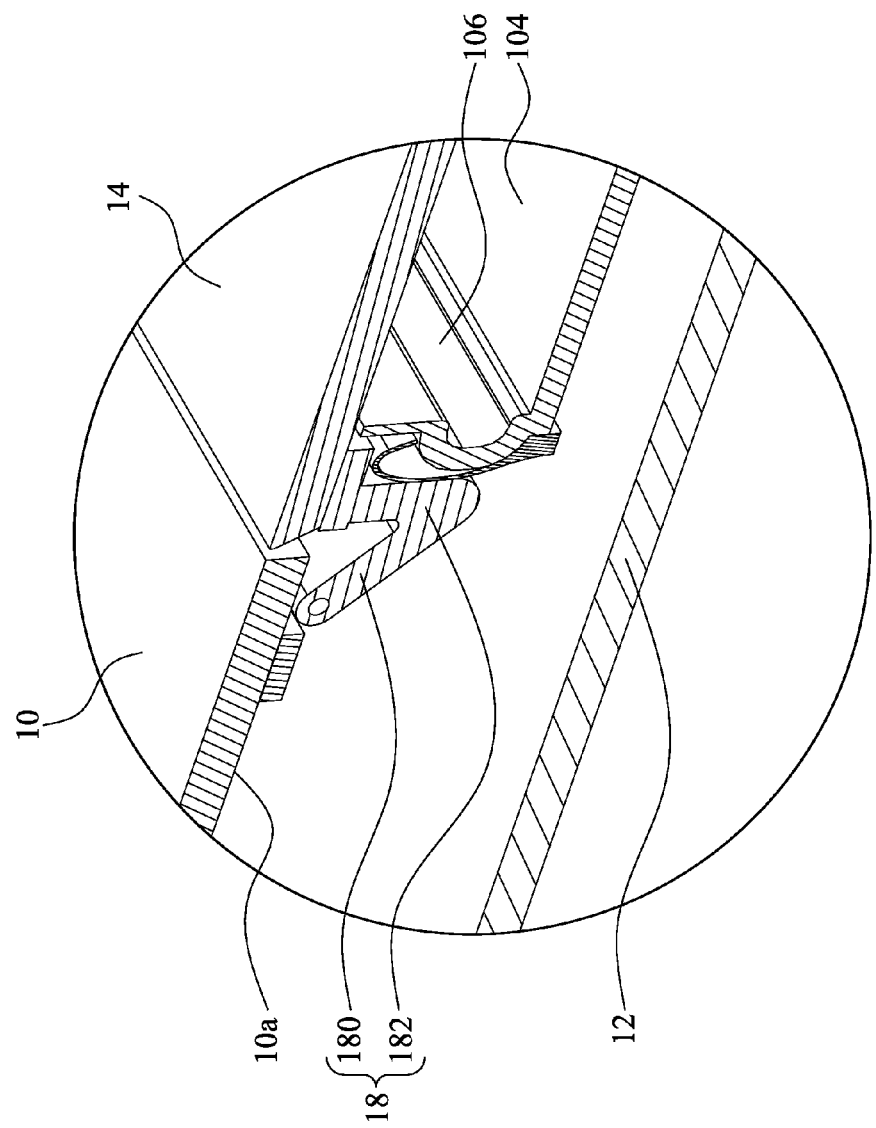
FIG. 6B is another cross-sectional view of the tablet computer in FIG. 6A, in which the cover has been rotated to a covering position relative to the housing.

FIG. 6A is a cross-sectional view of the tablet computer 1 in FIG. 2 along line 6A-6A'. FIG. 6B is another cross-sectional view of the tablet computer 1 in FIG. 6A, in which the cover 14 has been rotated to the covering position relative to the housing 10. In the description below, the configuration on only one side of the tablet computer 1 is explained. However, it is noted that in some embodiments, a similar configuration is present on an opposite side of the tablet computer 1.

As shown in FIG. 6A and FIG. 6B, the housing 10 of the tablet computer 1 further has a hole 110. The hole 110 of the housing 10 is adjacent to the accommodating trough 104. The tablet computer 1 further includes a hinge 18. The hinge 18 includes a pivotal portion 180 and a connecting portion 182. The pivotal portion 180 of the hinge 18 is pivotally connected to the housing 10 from the interior of the housing 10. Two ends of the connecting portion 182 of the hinge 18 are respectively connected to the pivotal portion 180 and the cover 14. In the embodiment of the disclosure, the pivotal portion 180 and the connecting portion 182 of the hinge 18 form a V-shaped structure, but the disclosure is not limited in this regard.

When the cover 14 rotates to the extended position relative to the housing 10 by the hinge 18 (as FIG. 1C and FIG. 6A show), the pivotal portion 180 of the hinge 18 abuts against an inner surface 10a of the housing 10 and the connecting portion 182 of the hinge 18 extends out of the hole 110 of the housing 10. When the cover 14 rotates to the covering position relative to the housing 10 by the hinge 18 (as FIG. 1B and FIG. 6B show), the pivotal portion 180 and the connecting portion 182 of the hinge 18 are located in the hole 110.

As shown in FIG. 6A and FIG. 6B, the tablet computer 1 further includes an elastic piece 20. The elastic piece 20 of the tablet computer 1 is disposed in the housing 10 and adjacent to the hole 110. More particularly, the pivotal portion 180 of the hinge 18 and the elastic piece 20 are respectively located at two opposite sides of the hole 110 and extend toward the center of the hole 110.

When the cover 14 rotates to the covering position relative to the housing 10 by the hinge 18 (as FIG. 1B and FIG. 6B show), the elastic piece 20 abuts against the connecting portion 182 of the hinge 18 to urge the cover 14 in a direction toward the opening 102, so that the elastic piece 20 has the effect of maintaining the cover 14 at the covering position. When the cover 14 rotates to the extended position relative to the housing 10 by the hinge 18 (as FIG. 1C and FIG. 6A show), the elastic piece 20 abuts against the pivotal portion 180 of the hinge 18 to, in turn, make the pivotal portion 180 abut against the inner surface 10a of the housing 10, so that the elastic piece 20 has the effect of maintaining the cover 14 at the extended position.

According to the foregoing recitations of the embodiments of the disclosure, it can be seen that the tablet computer has an accommodating trough for accommodating a keyboard and a cover for covering the accommodating trough. Therefore, when the cover covers the accommodating trough, the keyboard can be received in the interior of the tablet computer and the back of the tablet computer maintains its original and complete appearance, such that people are unaware of the presence of the keyboard. When the cover is extended relative to the housing, it can support the tablet computer in a standing position. In some embodiments, the accommodating trough has a groove, and the groove has an inlet section, a tapered section, and an engaging section, widths of which are reduced gradually. Therefore, during the insertion of the keyboard into the accommodating trough, the inlet section has the effect of allowing the engaging structure on the keyboard to easily enter the accommodating trough, the tapered section has the effect of smoothly guiding the engaging structure to move toward the engaging section, and the engaging section has the effect of engaging the engaging structure so as to prevent the keyboard from being removed from the accommodating trough along a direction away from the bottom of the accommodating trough.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A tablet computer comprising:
  a housing having an opening and an accommodating trough inwardly recessed from the opening, a sidewall of the accommodating trough having a groove, the groove having an inlet section and an engaging section, the inlet section being communicated between the opening and the engaging section, wherein widths of the inlet section are larger than widths of the engaging section;
  a cover pivotally connected to the housing so as to rotate between a covering position and an extended position relative to the housing, the cover covering the opening when rotated to the covering position, and supporting the housing in a standing position when rotated to the extended position; and
  a keyboard detachably accommodated in the accommodating trough and comprising at least one engaging structure, wherein the engaging structure is located at the peripheral edge of the keyboard and engaged with the engaging section,
  wherein a portion of the bottom of the accommodating trough that corresponds to the engaging section is parallel to the keyboard, and a portion of the bottom of the accommodating trough that corresponds to the inlet section is curved toward the opening along a direction away from the engaging section.

2. The tablet computer of claim 1, wherein the keyboard comprises a first ferromagnetic member, and the housing comprises a second ferromagnetic member disposed at the sidewall of the accommodating trough so as to magnetically attract the first ferromagnetic member when the keyboard is accommodated in the accommodating trough.

3. The tablet computer of claim 1, wherein the housing further has a hole, the tablet computer further comprises a hinge, and the hinge comprises:
   a pivotal portion pivotally connected to the housing from the interior of the housing; and
   a connecting portion, two ends of which are respectively connected to the pivotal portion and the cover,
   wherein the pivotal portion and the connecting portion are located in the hole when the cover is located at the covering position, and the pivotal portion abuts against an inner surface of the housing and the connecting portion extends out of the hole when the cover is located at the extended position.

4. The tablet computer of claim 3, further comprising an elastic piece disposed in the housing and adjacent to the hole, wherein the elastic piece abuts against the connecting portion to urge the cover toward the opening when the cover is located at the covering position, and abuts against the pivotal portion to urge the pivotal portion toward the inner surface when the cover is located at the extended position.

5. A tablet computer comprising:
   a housing having an opening and an accommodating trough inwardly recessed from the opening, a sidewall of the accommodating trough having a groove, the groove having an inlet section and an engaging section, the inlet section being communicated between the opening and the engaging section, wherein widths of the inlet section are larger than widths of the engaging section;
   a cover pivotally connected to the housing so as to rotate between a covering position and an extended position relative to the housing, the cover covering the opening when rotated to the covering position, and supporting the housing in a standing position when rotated to the extended position; and
   a keyboard detachably accommodated in the accommodating trough and comprising at least one engaging structure, wherein the engaging structure is located at the peripheral edge of the keyboard and engaged with the engaging section,
   wherein the groove further has a tapered section, two ends of the tapered section are respectively communicated with the inlet section and the engaging section, and widths of the tapered section are decreased from the inlet section to the engaging section.

6. The tablet computer of claim 5, wherein the bottom of the accommodating trough has a parallel portion and a curved portion, the parallel portion corresponds to the engaging section and partially to the tapered section, and is parallel to the keyboard, and the curved portion is connected to the parallel portion, corresponds to the inlet section and partially to the tapered section, and is curved toward the opening along a direction away from the engaging section.

7. The tablet computer of claim 6, wherein the keyboard is accommodated in the accommodating trough and supported on the parallel portion.

8. The tablet computer of claim 7, wherein the engaging structure is a protruding strip, a length of the protruding strip is equal to or smaller than a sum of a length of the engaging section and a length of the tapered section, the widths of the engaging section are uniform along the length thereof, a part of the protruding strip is accommodated in the tapered section, and another part of the protruding strip is accommodated in the engaging section.

9. A tablet computer comprising:
   a housing having an opening and an accommodating trough inwardly recessed from the opening, a sidewall of the accommodating trough having a groove, the groove having an inlet section and an engaging section, the inlet section being communicated between the opening and the engaging section, wherein widths of the inlet section are larger than widths of the engaging section;
   a cover pivotally connected to the housing so as to rotate between a covering position and an extended position relative to the housing, the cover covering the opening when rotated to the covering position, and supporting the housing in a standing position when rotated to the extended position; and
   a keyboard detachably accommodated in the accommodating trough and comprising at least one engaging structure, wherein the engaging structure is located at the peripheral edge of the keyboard and engaged with the engaging section,
   wherein the engaging structure comprises a plurality of protrusions, the widths of the engaging section are uniform along a length thereof, and the protrusions are engaged in the engaging section.

* * * * *